United States Patent
Jin et al.

(10) Patent No.: US 11,362,327 B2
(45) Date of Patent: Jun. 14, 2022

(54) DOUBLE LAYER-COATED NANO-SILICON NEGATIVE ELECTRODE MATERIAL, A METHOD FOR PREPARING THE SAME AND USE THEREOF

(71) Applicant: INSTITUTE OF PHYSICS, CHINESE ACADEMY OF SCIENCES, Beijing (CN)

(72) Inventors: Zhou Jin, Beijing (CN); Hailong Yu, Beijing (CN); Xuejie Huang, Beijing (CN)

(73) Assignee: INSTITUTE OF PHYSICS, CHINESE ACADEMY OF SCIENCES, Beijing (CN)

( * ) Notice: Subject to any disclaimer, the term of this patent is extended or adjusted under 35 U.S.C. 154(b) by 152 days.

(21) Appl. No.: 16/500,070

(22) PCT Filed: Sep. 5, 2017

(86) PCT No.: PCT/CN2017/100504
§ 371 (c)(1),
(2) Date: Oct. 1, 2019

(87) PCT Pub. No.: WO2019/047010
PCT Pub. Date: Mar. 14, 2019

(65) Prior Publication Data
US 2020/0194782 A1    Jun. 18, 2020

(51) Int. Cl.
*H01M 4/36* (2006.01)
*H01M 4/134* (2010.01)
(Continued)

(52) U.S. Cl.
CPC ........... *H01M 4/366* (2013.01); *H01M 4/134* (2013.01); *H01M 4/386* (2013.01); *H01M 4/626* (2013.01);
(Continued)

(58) Field of Classification Search
None
See application file for complete search history.

(56) References Cited

U.S. PATENT DOCUMENTS

2015/0024139 A1* 1/2015 Yoshida .............. C23C 18/1633
427/443.1

FOREIGN PATENT DOCUMENTS

| CN | 104979559 A | 10/2015 |
|---|---|---|
| CN | 105406050 A | 3/2016 |

(Continued)

OTHER PUBLICATIONS

International Searching Authority, "International Search Report," issued in connection with International Patent Application No. PCT/CN2017/100504, dated Jun. 4, 2018.
(Continued)

*Primary Examiner* — Wyatt P McConnell
(74) *Attorney, Agent, or Firm* — Foley & Lardner LLP

(57) ABSTRACT

This invention relates to a double layer composite-coated nano-silicon negative electrode material, and its preparation methods and use, the negative electrode material comprising: a silicon-based nanoparticle, a copper layer coated on the surface of the silicon-based nanoparticle, and a conductive protective layer coated on the surface of the copper layer. Nano-copper has superplastic ductility and conductivity, and the prior art has proved that lithium ions can penetrate nano-copper; therefore, the copper coating layer has effects of inhibiting the volume expansion of the silicon-based nanoparticle and keeping the silicon-based nanoparticle from cracking so that direct contact between the silicon-based nanoparticle and an electrolyte is effectively avoided and a stable SEI is formed, and increasing the conductivity of the electrode. The surface of the nano-copper is coated with a further conductive protective layer to (Continued)

effectively inhibit the oxidation of the nano-copper, thereby improving the electrochemical performance.

18 Claims, 7 Drawing Sheets

(51) Int. Cl.
    *H01M 4/38*         (2006.01)
    *H01M 4/62*         (2006.01)
    *H01M 10/0525*     (2010.01)
    *H01M 4/02*         (2006.01)

(52) U.S. Cl.
    CPC ....... *H01M 4/628* (2013.01); *H01M 10/0525* (2013.01); *H01M 2004/021* (2013.01); *H01M 2004/027* (2013.01)

(56) References Cited

FOREIGN PATENT DOCUMENTS

| | | |
|---|---|---|
| CN | 106711415 A | 5/2017 |
| CN | 107492651 A | 12/2017 |
| WO | WO-2015/026559 A1 | 2/2015 |

OTHER PUBLICATIONS

International Searching Authority, "Written Opinion," issued in connection with International Patent Application No. PCT/CN2017/100504, dated Jun. 4, 2018.

* cited by examiner

DOUBLE LAYER-COATED NANO-SILICON NEGATIVE ELECTRODE MATERIAL, A METHOD FOR PREPARING THE SAME AND USE THEREOF

RELATED APPLICATION

The present application is a national phase and claims priority under 37 U.S.C. § 371 to International Patent Application No. PCT/CN2017/100504, filed Sep. 5, 2017, the contents of which are hereby incorporated by reference in their entirety.

TECHNICAL FIELD

This invention relates to the field of negative electrode materials for lithium-ion batteries, and specifically relates to a double layer composite-coated nano-silicon negative electrode material, and its preparation methods and use.

BACKGROUND ART

Due to the rapid development and broad application of portable electronic devices and electric vehicles, there is an urgent need for lithium-ion batteries with high specific energy and long cycle life. The lithium-ion batteries currently commercially used mainly use graphite as negative electrode materials, however, since the theoretical specific capacity of graphite is only 372 mAh/g, the further improvement of specific energy of the lithium-ion batteries is limited.

Silicon has attracted great attention from researchers because of extremely high theoretical lithium intercalation specific capacity (up to 4200 mAh/g) and low lithium storage potential thereof, and it is one of the ideal candidates for new high-capacity lithium storage materials. However, during the process of lithium intercalation/deintercalation, the silicon material has a serious volume change, easily causing the pulverization of the silicon particles, causing the active material to fall off from the current collector, and resulting in a significant decrease in the cycling stability of the electrode. Meanwhile, when the silicon particles are exposed to the electrolyte, an unstable SEI film will be formed on the surface of silicon, reducing the cycling performance of the electrode material. Additionally, the silicon material is a semiconductor, so its conductivity is inferior to that of the graphite negative electrode, which limits its rate capability. Therefore, if the problems of volume change, poor conductivity and the unstable SEI of silicon negative electrode during lithium intercalation/deintercalation process can be solved, it would contribute to the applications of silicon negative electrode in the field of electronic products and new energy vehicles, which would improve people's lives and environment.

In order to solve the problems of volume change, poor conductivity and the unstable SEI of silicon negative electrode during lithium intercalation/deintercalation process, silicon coating is generally used to improve the cycling performance of the silicon negative electrode material. On the one hand, nano-silicon can reduce the absolute volume change of silicon particles caused by lithium ion intercalation, and reduce the internal stress of composite materials; on the other hand, the surface coated with materials with good conductivity of the nano-silicon can solve the problem of conductivity and avoid the direct contact between silicon and the electrolyte to form a stable SEI. Chinese Patent Application Publication No. CN104979559A discloses a nano-copper-coated nano-silicon composite material, wherein nano-copper is coated on porous nano-silicon particles prepared by acid etching silicon alloy through chemical copper plating. By this method, although copper is plated on the surface of silicon, there are many copper particles on the surface of silicon and no copper film is formed. Therefore, it cannot effectively avoid the direct contact between silicon and the electrolyte to form an unstable SEI. Furthermore, the copper formed by the method contains a large amount of cuprous oxide, which has a negative influence on the cycling performance of the material.

DESCRIPTION OF THE INVENTION

Accordingly, the object of the present invention is to make up for the deficiencies of the prior art, and to provide a lithium-ion negative electrode material capable of improving the conductivity and electrochemical cycling characteristics of a silicon negative electrode material, and a method for preparing the same and use thereof.

The present invention provides a double layer-coated nano-silicon negative electrode material comprising: a silicon-based nanoparticle, a copper layer coated on the surface of the silicon-based nanoparticles, and a conductive protective layer coated on the surface of the copper layer.

In the nano-silicon negative electrode material according to the present invention, the silicon-based nanoparticle can comprise silicon nanoparticle, silicon-carbon nanoparticle, and silicon alloy nanoparticle. The weight percentage of silicon in the silicon-carbon nanoparticle and the silicon alloy nanoparticle can be 2% to 70%. The silicon alloy can be selected from one or more of silicon-aluminum alloy, silicon-tin alloy, silicon-silver alloy, silicon-magnesium alloy and the like.

Preferably, the silicon-based nanoparticle can have a particle size of 5~500 nm, preferably 20~200 nm; preferably, the copper layer has a thickness of 0.5~100 nm, preferably 1~50 nm; and the conductive protective layer can have a thickness of 1~200 nm, preferably 5~50 nm. The copper layer can be a nano-copper particle or a copper coating layer with nanometer thickness. Preferably, the copper particle can have a particle size of 0.5~100 nm, preferably 1~50 nm; and the copper coating layer can have a thickness of 0.5~100 nm, preferably 1~50 nm.

In the nano-silicon negative electrode material according to the present invention, the mass of the copper layer accounts for 0.5~60 wt %, preferably 10~40 wt % of the nano-silicon negative electrode material; and the mass of the conductive protective layer on the surface of the copper layer accounts for 0.1~20 wt %, preferably 1~10 wt % of the nano-silicon negative electrode material.

The present invention also provides a method for preparing said double layer-coated nano-silicon negative electrode material, which comprises the steps of:

(1) adding a silicon-based nanoparticle to a solvent, then adding a dispersing agent to obtain a suspension, and then ultrasonically dispersing the suspension;

(2) adding a copper plating agent to the ultrasonically dispersed suspension, and then adding dropwise a reducing agent to perform chemical copper plating, finally filtrating, washing and drying the same in vacuum oven to obtain a nano-copper-coated silicon-based nanocomposite material; and (3) coating a conductive protective layer on the surface of the nano-copper-coated silicon-based nanocomposite material.

According to the present invention, the method as provided can further comprise:

(4) rapidly heat treating the composite material obtained in step (3) to cure it.

In the method according to the present invention, the solvent in step (1) can be one or more of water, methanol, ethanol, propanol, isopropanol, butanol and ethylene glycol, preferably water and/or ethanol. The concentration of the nano-silicon in the nano-silicon suspension can be 0.1~10 $g·L^{-1}$, preferably 0.5~5 $g·L^{-1}$.

In the method according to the present invention, the dispersing agent in step (1) can be one or more of methanol, ethanol, ethylene glycol, propanol and isopropanol, preferably methanol and/or ethanol.

In the method according to the present invention, the composition of the copper plating agent in step (2) is as follows: soluble copper salt: 1~20 $g·L^{-1}$, preferably 1~10 $g·L^{-1}$; potassium sodium tartrate ($C_4O_6H_4KNa$): 5~100 $g·L^{-1}$, preferably 10~30 $g·L^{-1}$; ethylenediaminetetraacetic acid ($C_{10}H_{16}N_2O_8$) or ammonia water ($NH_4·H_2O$): 5~100 $g·L^{-1}$, preferably 10~30 $g·L^{-1}$; 2,2-bipyridine ($C_{10}H_8N_2$): 1~50 $mg·L^{-1}$, preferably 5~15 $mg·L^{-1}$. In the method, the soluble copper salt comprises one or more of tetrakis(acetonitrile)copper(I) hexafluorophosphate ($C_8H_{12}CuF_6N_4P$), $CuCl_2$, $CuCl$, $CuC_2O_4$, $Cu(CH_3COO)_2$, $CuSO_4$ and $Cu(NO_3)_2$. Preferably, the reducing agent is sodium borohydride, sodium hypophosphite, borane or formaldehyde, preferably sodium borohydride, the concentration of the reducing agent can be 1~20 $g·L^{-1}$, preferably 2~5 $g·L^{-1}$.

In the method according to the present invention, the conductive protective layer on the surface of the copper layer in step (3) can be carbon, polyaniline, polypyrrole, polythiophene, polyacetylene or other conductive polymers. Coating a conductive protective layer is carried out by a method including hydrothermal coating, organic coating, and CVD coating, preferably CVD coating. Preferably, the CVD coating is to coat with carbon by $C_2H_2$ gas, the conditions of coating comprises: $C_2H_2$: 1~300 sccm, preferably 50~150 sccm; temperature: 300~450° C., preferably 350~400° C.; time: 5 min~10 h, preferably 1~4 h.

In the method according to the present invention, the heat treating in step (4) comprises: heat radiation and microwave heating, preferably microwave heating.

The present invention also provides a negative electrode, which comprises a current collector and a negative electrode material, a conductive additive, and a binder loaded on the current collector, wherein the negative electrode material is a negative electrode material of the present invention or a negative electrode material prepared by a method of the present invention.

The present invention also provides a lithium-ion battery, which comprises a battery shell, an electrode assembly, and an electrolyte, the electrode assembly and electrolyte being sealed in the battery shell, and the electrode assembly comprising a positive electrode, a separator, and a negative electrode, wherein the negative electrode is a negative electrode of the present invention.

The nano-silicon negative electrode material provided by the present invention and the method for preparing the same have the following advantages and beneficial effects.

1. The synthesis process adopted by the present invention is simple, the equipment used is conventional equipment, and the cost is low; the nano-silicon material used is an industrialized, low-cost silicon powder, and the copper plating and carbon coating processes are simple and effective. The double layer composite-coated nano-silicon negative electrode material has excellent electrochemical performance when used as a negative electrode material for lithium-ion batteries, and has potential application prospects in portable mobile devices and electric vehicles.

2. The present invention uses the double layer-coating method, and the coating layer on the surface of the nano-silicon surface consists of a copper coating layer and a carbon coating layer, the copper coating layer is wrapped on the outer surface of the nano-silicon, and the carbon coating layer is wrapped on the outer surface of the copper coating layer. Nano-copper has superplastic ductility and conductivity [1]; and the prior art has proved that lithium ions can penetrate nano-copper [2]; therefore, the copper coating layer has the following effects: (1) inhibiting the volume expansion of the nano-silicon and keeping the silicon-based nanoparticle from cracking; (2) effectively avoiding direct contact between the silicon-based nanoparticle and the electrolyte; and (3) increasing the conductivity of the electrode. However, nano-copper is easily oxidized to form copper oxide and cuprous oxide and form an unfavorable SEI on the surface, which leads a great negative effect on the electrochemical cycling performance. Therefore, the surface of the nano-copper is coated with a further carbon layer to effectively inhibit the oxidation of the nano-copper to improve the electrochemical performance.

3. In the second method of the present invention, the double layer composite-coated nano-silicon negative electrode material is cured by low-temperature rapid heat treating to melt the copper particles and connect them to form a copper film, thereby ensuring that the nano-silicon particles are completely coated by copper.

BEST MODE FOR CARRYING OUT THE INVENTION

Figure 1:
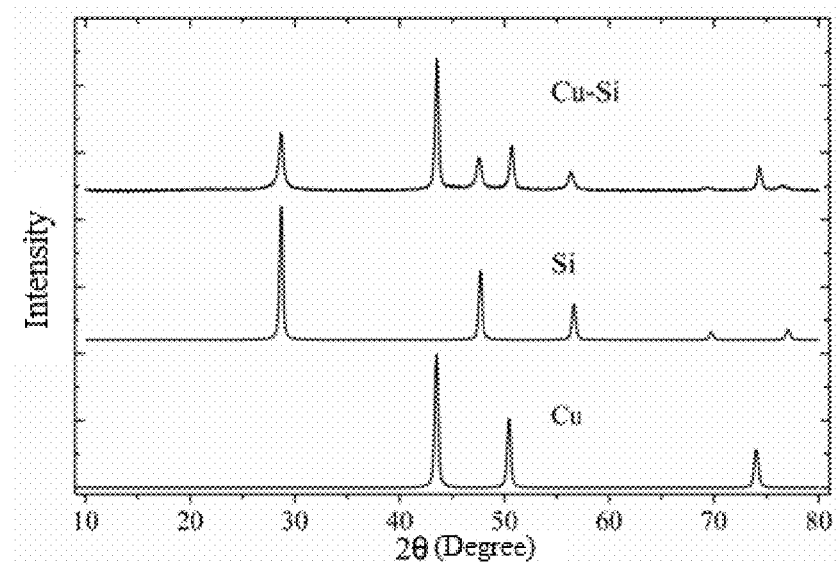
FIG. 1 is an XRD spectrum of the double layer composite-coated nano-silicon material prepared in Example 2 of the present invention.

The present invention will be further illustrated in conjunction with examples. The examples are merely illustrative and are in no way meant to limit the scope of the present invention in any way.

Example 1

(1) 0.5 g of silicon powder with a particle size of 100 nm was weighed and added into 1000 ml water, then 20 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, then sodium hydroxide was added to adjust pH to 10. Then 0.6 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material; and (3) The nano-copper-coated nano-silicon composite material was placed in a tube furnace and coated with carbon by $C_2H_2$ in nitrogen, the $N_2$ flow rate was 300 sccm, the $C_2H_2$ flow rate was 100 sccm, the heating rate was 50° C./min, and the temperature was maintained at 380° C. for 90 min, to obtain the double layer composite-coated nano-silicon negative electrode material.

Example 2

(1) 0.5 g of silicon powder with a particle size of 100 nm was weighed and added into 1000 ml water, then 20 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, then sodium hydroxide was added to adjust pH to 10. Then 0.6 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material;

(3) The nano-copper-coated nano-silicon composite material was placed in a tube furnace and coated with carbon by $C_2H_2$ in nitrogen, the $N_2$ flow rate was 300 sccm, the $C_2H_2$ flow rate was 100 sccm, the heating rate was 50° C./min, and the temperature was maintained at 380° C. for 90 min; and (4) The carbon-coated nano-copper-coated nano-silicon composite material was placed in an ultra-high-speed microwave heating furnace protected by nitrogen and microwave-heated to 350° C., and then cooled to obtain a double layer composite-coated nano-silicon negative electrode material.

Example 3

(1) 0.5 g of silicon powder with a particle size of 100 nm was weighed and added into 1000 ml water, then 20 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, then sodium hydroxide was added to adjust pH to 10. Then 0.6 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material; and (3) The nano-copper-coated nano-silicon composite material was placed in a 200 ml reaction kettle, then 1 g toluene and 0.2 g $Ti(OBu)_4$-$AlEt_3$ catalyst were added, then the reaction kettle was filled with acetylene, and the reaction kettle was placed in a −78° C. oven to react for 10 hours. After completion of the reaction, 100 ml of 10% hydrochloric acid was added to the mixture to destroy the catalyst, and finally it was filtrated, washed, and dried in vacuum oven to obtain the composite material with polyacetylene coated on the surface of the copper layer.

Example 4

(1) 0.5 g of silicon powder with a particle size of 100 nm was weighed and added into 1000 ml water, then 20 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, then sodium hydroxide was added to adjust pH to 10. Then 0.6 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material; and (3) The nano-copper-coated nano-silicon composite material and 2 ml aniline were added in 50 ml deionized water and ultrasonically mixed, then 0.5 g of ammonium persulfate was added to the mixed solution, and after reacting for 2 hours, the mixture was filtrated, washed, and oven dried to obtain a composite material with polyaniline coated on the surface of the copper layer.

Example 5

(1) 0.3 g of silicon-carbon powder (Si:C=1:1) with a particle size of 100 nm was weighed and added into 1000 ml water, then 20 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 2 g $CuSO_4$, 20 g potassium sodium tartrate, 20 g ethylenediaminetetraacetic acid, and 10 mg 2,2-bipyridine, then sodium hydroxide was added to adjust pH to 10. Then 1 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material; and (3) The nano-copper-coated nano-silicon composite material was placed in a tube furnace and coated with carbon by $C_2H_2$ in nitrogen, the $N_2$ flow rate was 300 sccm, the $C_2H_2$ flow rate was 100 sccm, the heating rate was 50° C./min, and the temperature was maintained at 380° C. for 90 min, to obtain a double layer composite-coated nano-silicon-carbon negative electrode material.

Example 6

(1) 0.5 g of silicon-aluminum alloy (Si:Al=95:5) with a particle size of 100 nm was weighed and added into 1000 ml water, then 10 ml of ethanol was added to obtain a nano-silicon suspension, and then the nano-silicon suspension was placed in an ultrasonic machine and subjected to ultrasonic treatment for 2 h;

(2) The ultrasonically dispersed nano-silicon suspension was continuously stirred with a magnetic stirrer while nitrogen gas was continuously introduced into the solution. Then a copper plating agent having the following composition was added to the solution: 1 g $CuSO_4$, 10 g potassium sodium tartrate, 10 g ethylenediaminetetraacetic acid, and 5 mg 2,2-bipyridine, then sodium hydroxide was added to adjust pH to 10. Then 0.6 g sodium borohydride was added into 200 ml water, sodium hydroxide was also added to adjust pH to 10, and then it was added dropwise into the nano-silicon suspension at a rate of about 30 drops/min, and finally it was filtrated, washed with a copper protective agent being added, and dried in vacuum oven to obtain the nano-copper-coated nano-silicon composite material; and (3) The nano-copper-coated nano-silicon-aluminum composite material was placed in a tube furnace and coated with carbon by $C_2H_2$ in nitrogen gas, the $N_2$ flow rate was 300 sccm, the $C_2H_2$ flow rate was 100 sccm, the heating rate was 50° C./min, and the temperature was maintained at 380° C. for 90 min, to obtain a double layer composite-coated nano-silicon-aluminum negative electrode material.

The electrical properties of the negative electrode materials prepared in Examples 1, 2, 3 and 4 were tested. The main steps were as follows:

The prepared double layer composite-coated nano-silicon negative electrode material was uniformly mixed with super-p (conductive carbon black) and sodium alginate at a mass ratio of 6:3:1 by a mixer, then it was uniformly coated on a copper foil, placed in a vacuum drying oven, vacuum-dried at 120° C. for 12 hours, and taken out and prepared into an electrode plate.

The lithium plate was used as a counter electrode, the electrolyte was 1 mol/l $LiPF_6$ in EC+DMC (1:1 by volume), and a PP/PE/PP three-layer film was used as a separator (purchased from Celgard Corporation, USA), a CR2032 button battery was assembled in an argon-filled glove box.

The electrochemical properties test of the assembled battery was carried out using a Land tester (purchased from Wuhan LAND Electronics Co. Ltd.), with cycling for one cycle at a rate of 0.05 C and then cycling for another 49 cycles at a rate of 0.2 C, the charge-discharge cutoff voltage ranges from 0.01V to 1.0V.

Comparative Example 1

According to the method for preparing the button battery in Examples 1 and 2, silicon particles with a particle size of 100 nm were directly prepared into a button battery and the battery was subjected to charge-discharge cycling performance test in accordance with the electrochemical performance test conditions in Examples 1 and 2.

Comparative Example 2

According to the method for preparing a button battery in Examples 1 and 2, the only copper-coated silicon nanoparticles prepared in the step (2) were prepared into a button battery and the battery was subjected to charge-discharge cycling performance test in accordance with the electrochemical performance test conditions in Examples 1 and 2.

Comparative Example 3

According to the method for preparing a button battery in Examples 1 and 2, silicon-carbon particles with a particle size of 100 nm were directly prepared into a button battery and the battery was subjected to charge-discharge cycling performance test in accordance with the electrochemical performance test conditions in Examples 1 and 2.

Comparative Example 4

According to the method for preparing a button battery in Examples 1 and 2, silicon-aluminum particles with a particle size of 100 nm were directly prepared into a button battery and the battery was subjected to charge-discharge cycling performance test in accordance with the electrochemical performance test conditions in Examples 1 and 2.

Test Results and Analysis

Figure 2:
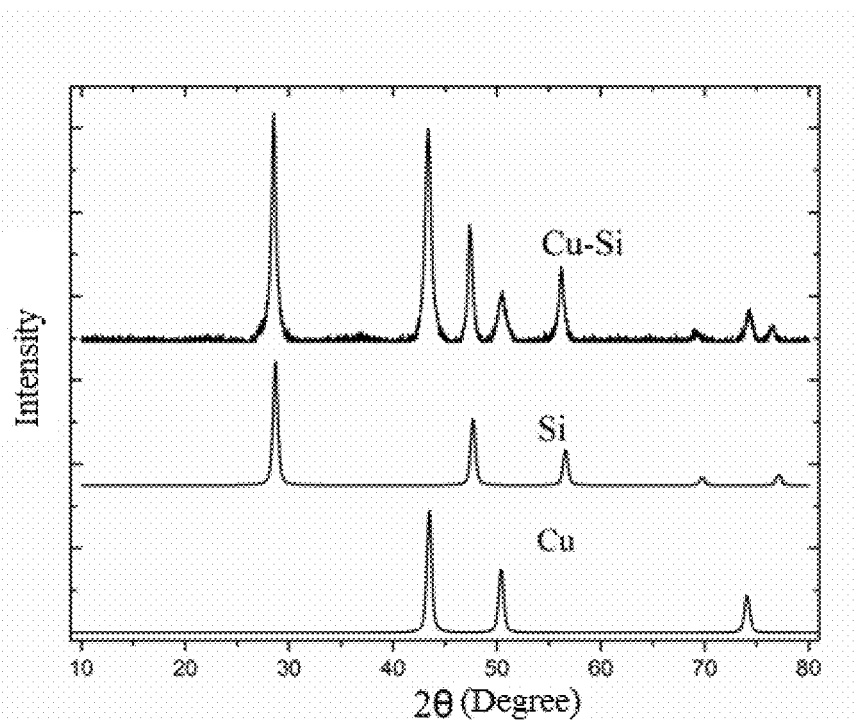
FIG. 2 is an XRD spectrum of only copper-coated nano-silicon material prepared in Comparative Example 2.

It can be observed from the XRDs of FIG. 1 and FIG. 2 that there are peaks for only the elemental silicon and elemental copper in the XRDs of the double layer composite-coated nano-silicon negative electrode material prepared in Example 2 and the only copper-coated nano-silicon material prepared in Comparative Example 2, without any other peaks.

Figure 3:
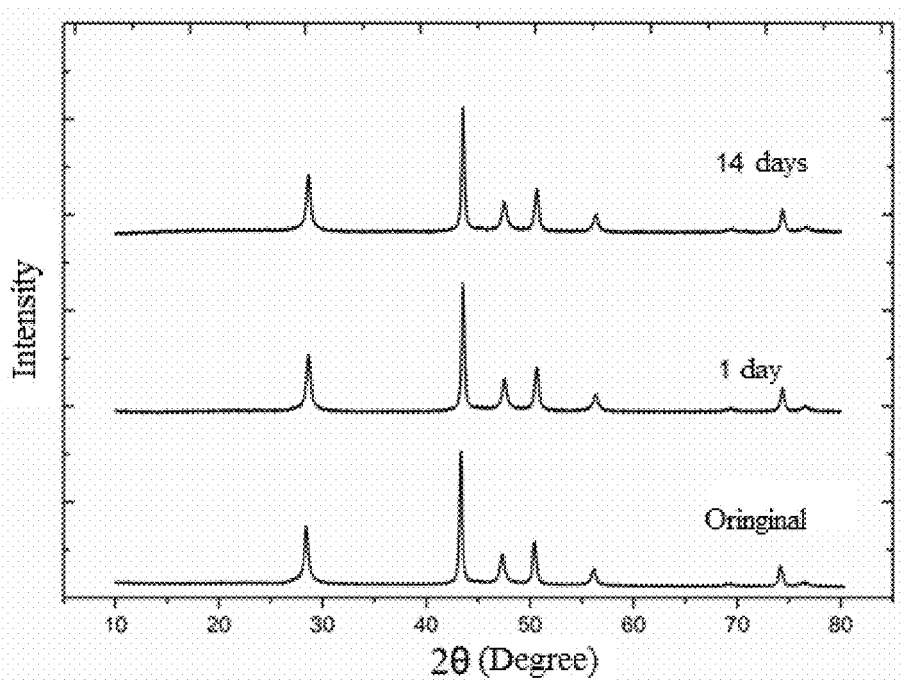
FIG. 3 is XRD spectra of the double layer composite-coated nano-silicon material prepared in Example 2 of the present invention after being placed in air for 1 day and 14 days.
Figure 4:
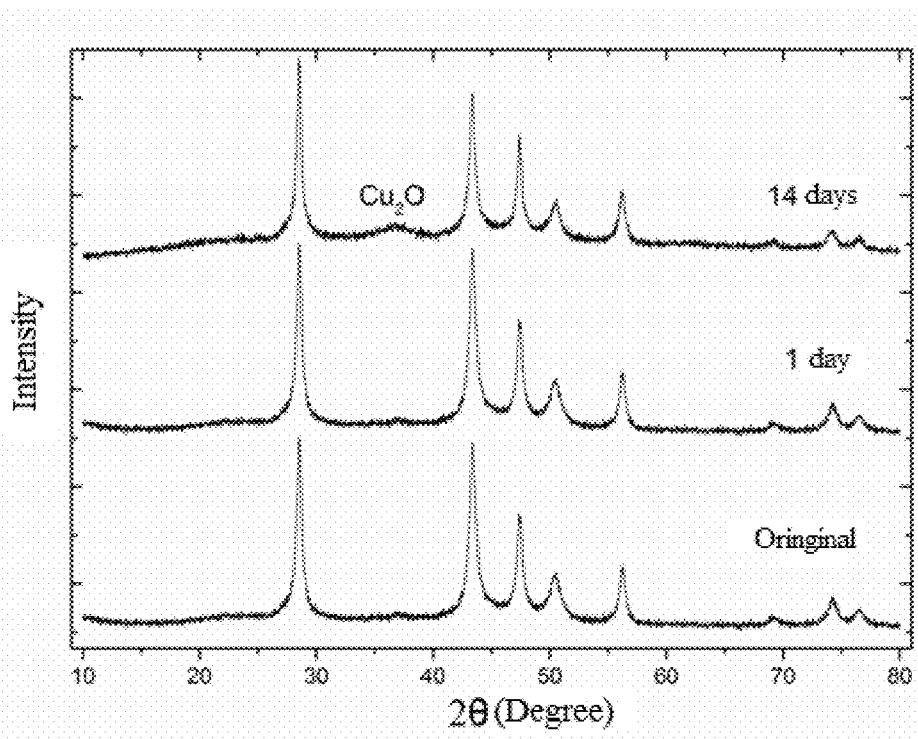
FIG. 4 is XRD spectra of only copper-coated nano-silicon material prepared in Comparative Example 2 after being placed in air for 1 day and 14 days.

It can be observed from the XRDs of FIG. 3 and FIG. 4 that there are still no any other peaks in the XRDs of the double layer composite-coated nano-silicon negative electrode material prepared in Example 2 after being placed in air for 1 day and 14 days, while the peaks for cuprous oxide will gradually appear in the XRDs of the only coppercoated nano-silicon material of Comparative Example 2 after being placed in air for 1 day and 14 days, indicating that the conductive protective layer on the copper surface outside the nano-copper can inhibit the oxidation of the nano-copper.

Figure 5:
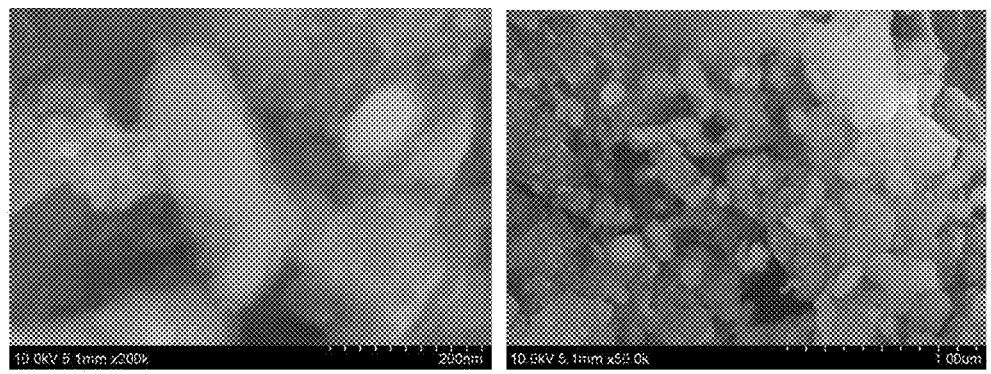
FIG. 5 is an SEM image of the double layer-coated nano-silicon negative electrode material prepared in Example 2 of the present invention.

It can be observed from the SEM image of FIG. 5 that, in the double layer composite-coated nano-silicon negative electrode material prepared in Example 2, there is obviously a coating layer on the surface of the nano-silicon particles, the coating is very complete, and silicon is completely inside the coating layer.

Figure 6:
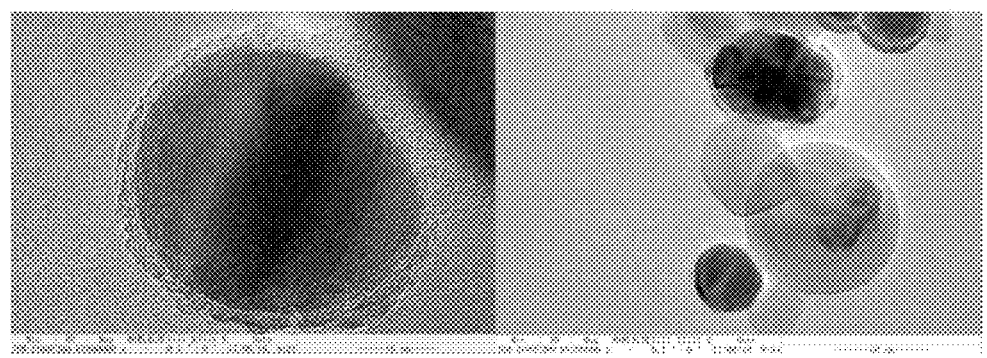
FIG. 6 is a TEM image of the double layer-coated nano-silicon negative electrode material prepared in Example 2 of the present invention.

It can be observed from the TEM image of FIG. 6 that the surface of the nano-silicon particles in the double layer composite-coated nano-silicon negative electrode material prepared in Example 2 has obviously shaped and amorphous coating layers and the coating is very complete.

Figure 7:
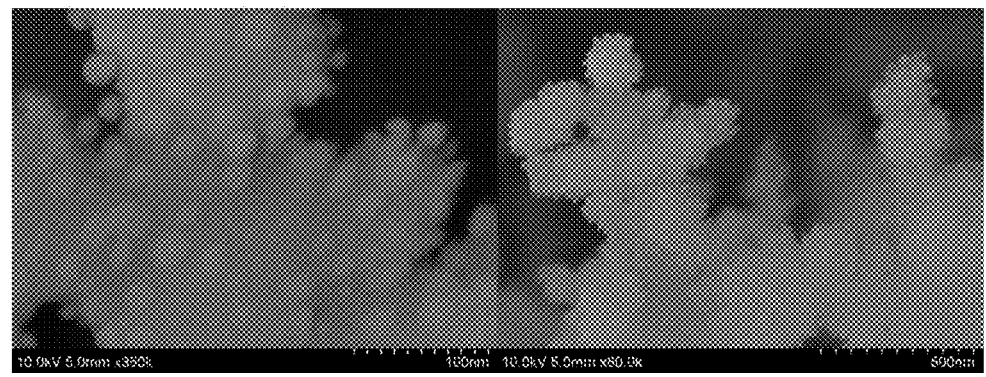
FIG. 7 is an SEM image of only copper-coated nano-silicon negative electrode material prepared in Comparative Example 2.

It can be observed from the SEM image of FIG. 7 that in the only copper-coated nano-silicon material of Comparative Example 2, there are some copper particles of from several nanometers to tens of nanometers on the silicon surface of about 100 nm, and there is a coating layer on the surface of the nano-silicon.

Figure 8:
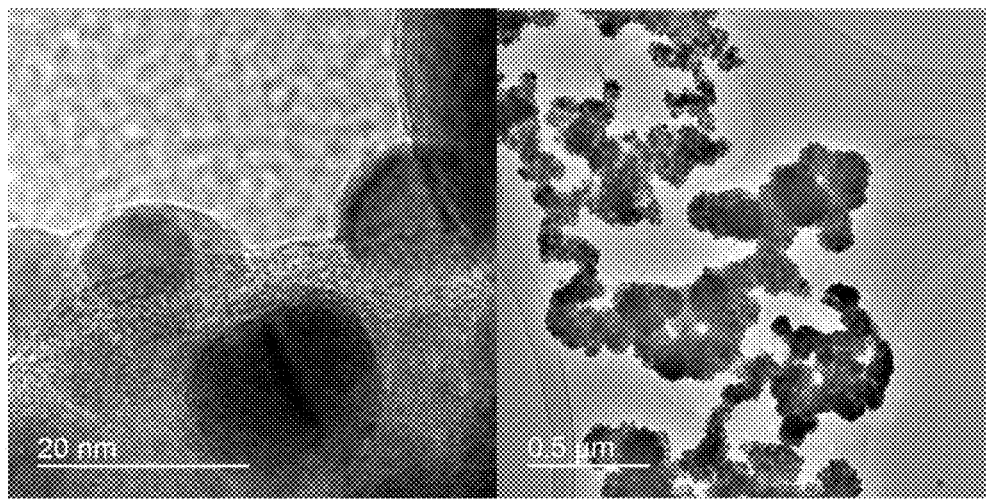
FIG. 8 is a TEM image of only copper-coated nano-silicon negative electrode material prepared in Comparative Example 2.

It can be observed from the TEM image of FIG. 8 that in the only copper-coated nano-silicon material of Comparative Example 2, at the surface of the nano-silicon there is copper coating layer copper with a nanometer thickness, and there are also some nano-copper particles on the surface, and the coating is very complete with silicon being completely inside the coating layer.

Figure 9:
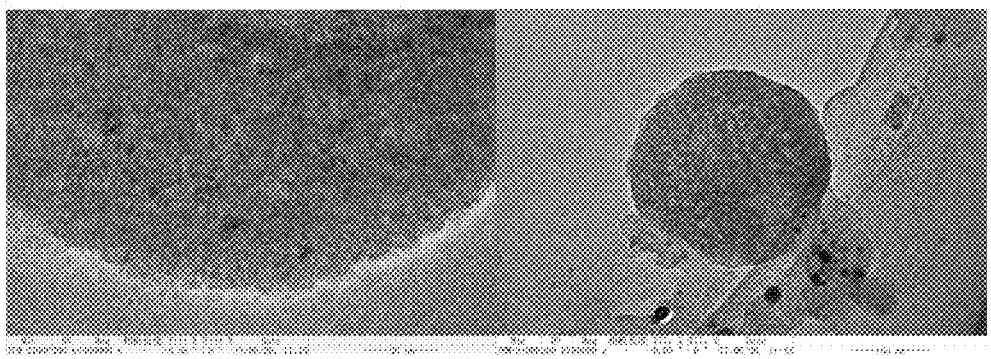
FIG. 9 is a TEM image of the double layer composite-coated nano-silicon negative electrode material prepared in Example 2 of the present invention in the first cycle of lithium intercalation state.

It can be observed from the TEM image of FIG. 9 that the double layer composite-coated nano-silicon negative electrode material prepared in Example 2, after the first cycle lithium intercalation, double layer composite-coated nano-silicon particles have a certain volume expansion but do not crack, and their volume expansion is significantly smaller than the 320% volume expansion of the silicon itself.

Figure 10:
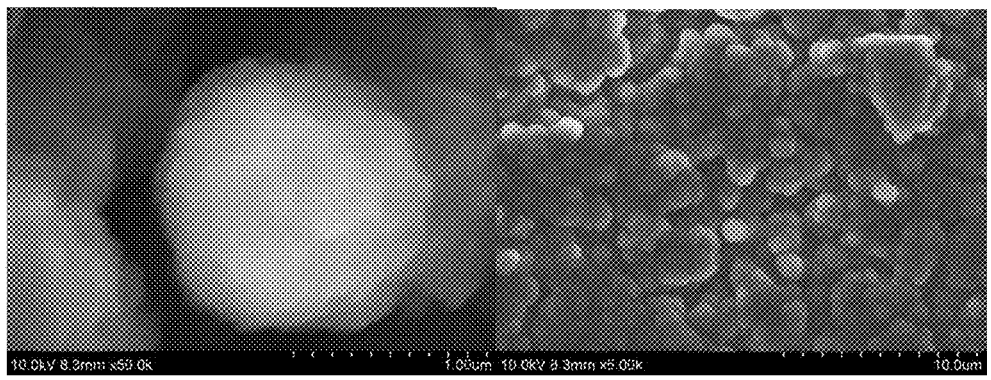
FIG. 10 is an SEM image of the double layer composite-coated nano-silicon negative electrode material prepared in Example 2 of the present invention in 35 cycles of lithium intercalation state.

It can be observed from the SEM image of FIG. 10 that the double layer composite-coated nano-silicon negative electrode material prepared in Example 2, after 35 cycles lithium intercalation, the double layer composite-coated nano-silicon material does not crack.

Figure 11:
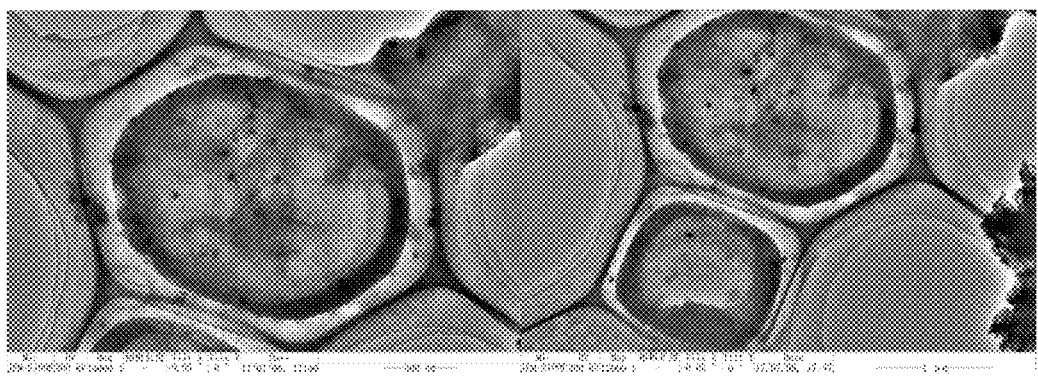
FIG. 11 is a TEM image of the double layer composite-coated nano-silicon negative electrode material prepared in Example 2 of the present invention in 35 cycles of lithium intercalation state.

It can be observed from the TEM image of FIG. 11 that the double layer composite-coated nano-silicon negative electrode material prepared in Example 2, after 35 cycles lithium intercalation, the double layer composite-coated nano-silicon particles have an obvious volume expansion but still does not crack, moreover, the outer coating layer is not destroyed, and the shape of the double layer composite-coated nano-silicon particles is still maintained.

Figure 12:
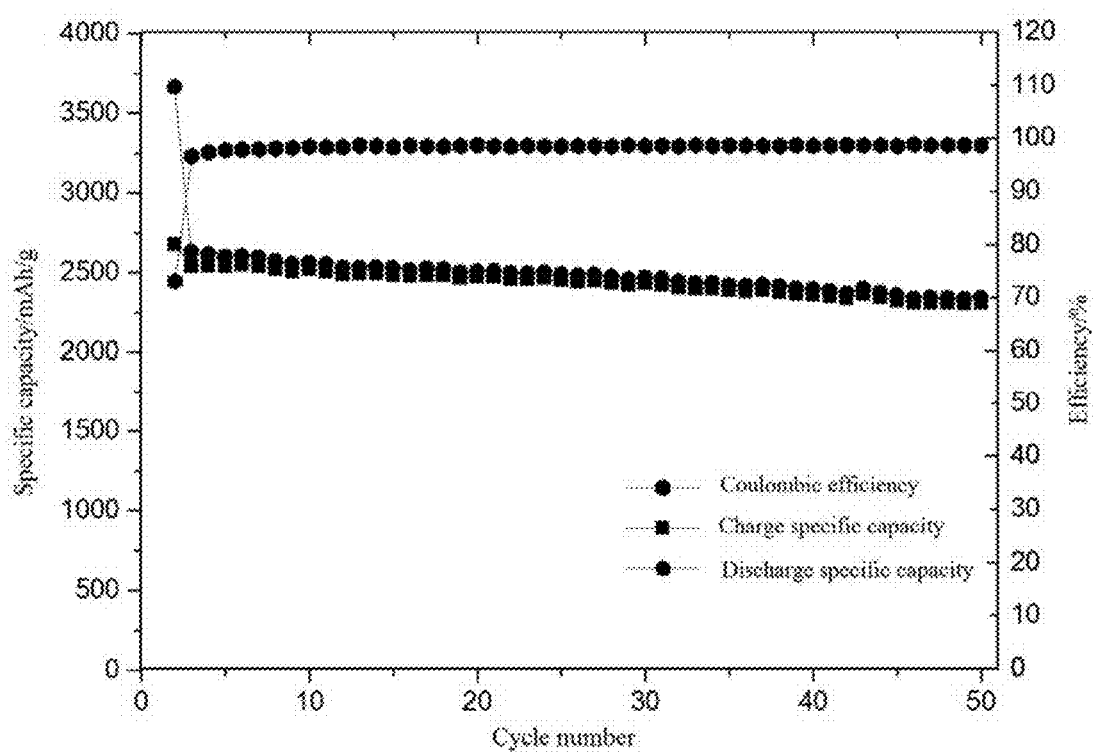
FIG. 12 is a graph showing charge-discharge cycling discharge capacity and charge-discharge efficiency of a lithium-ion battery comprising the double layer composite-coated nano-silicon negative electrode material prepared in Example 1 of the present invention.
Figure 13:
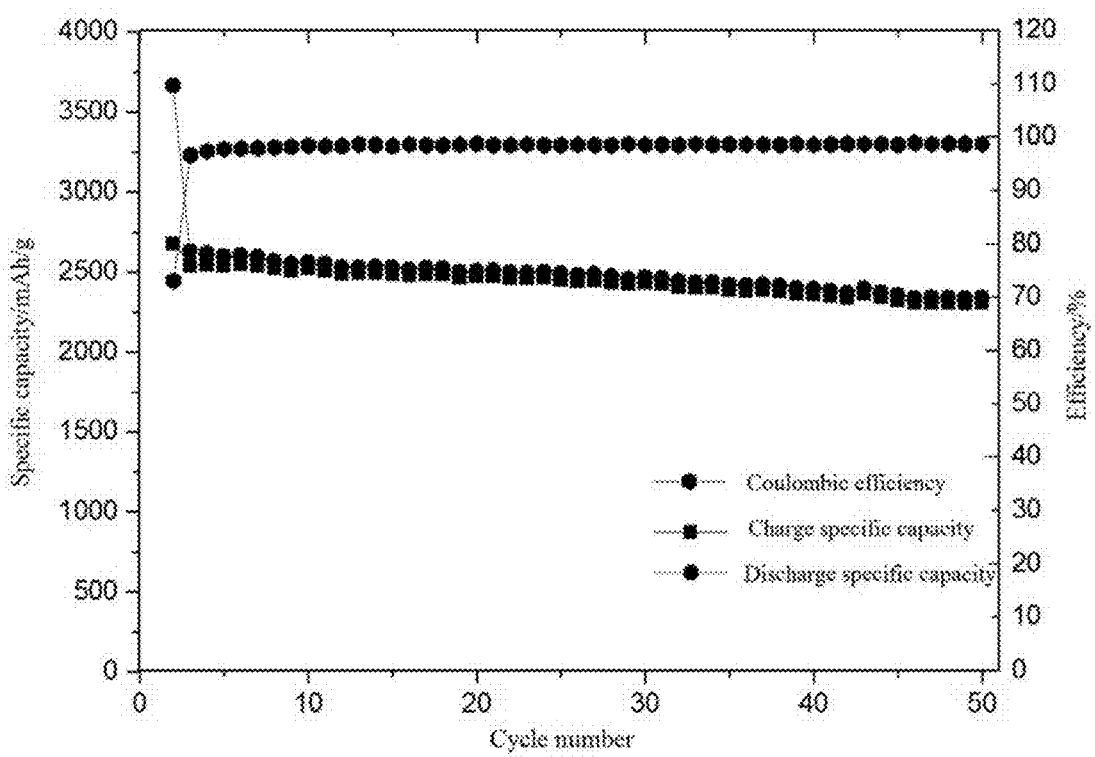
FIG. 13 is a graph showing charge-discharge cycling discharge capacity and charge-discharge efficiency of a lithium-ion battery comprising the double layer composite-coated nano-silicon negative electrode material prepared in Example 2 of the present invention.
Figure 14:
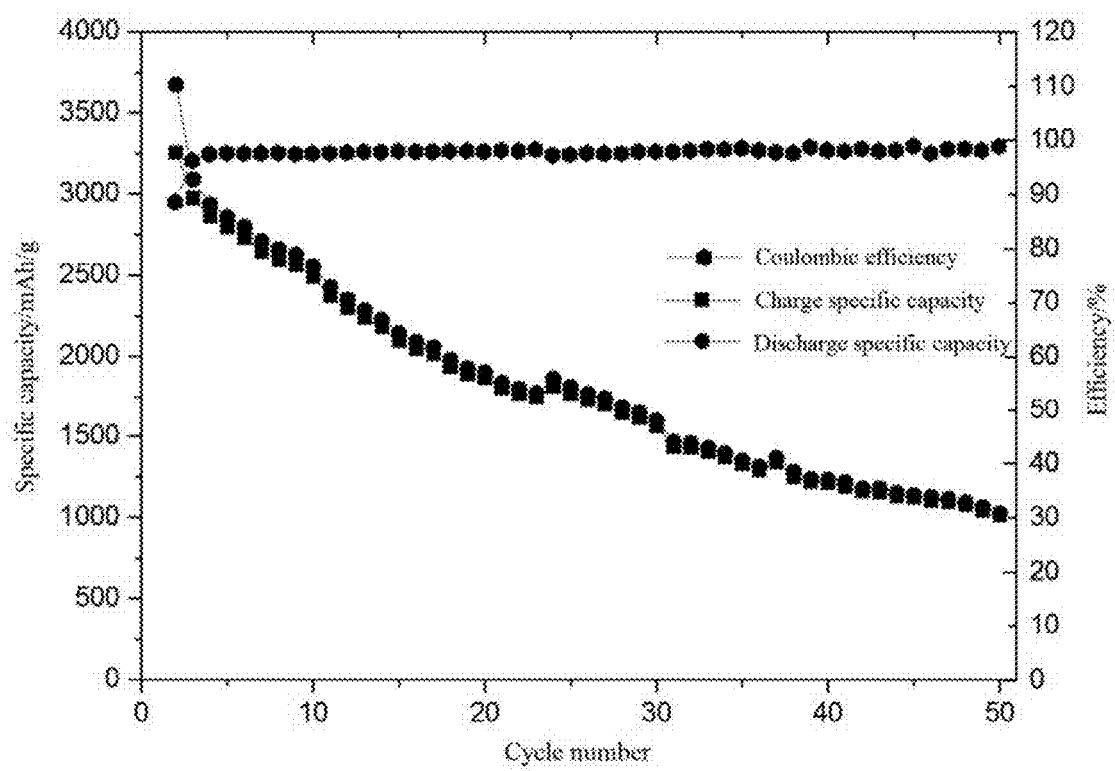
FIG. 14 is a graph showing charge-discharge cycling discharge capacity and charge-discharge efficiency of a lithium-ion battery comprising the uncoated nano-silicon negative electrode material prepared in Comparative Example 1 of the present invention.
Figure 15:
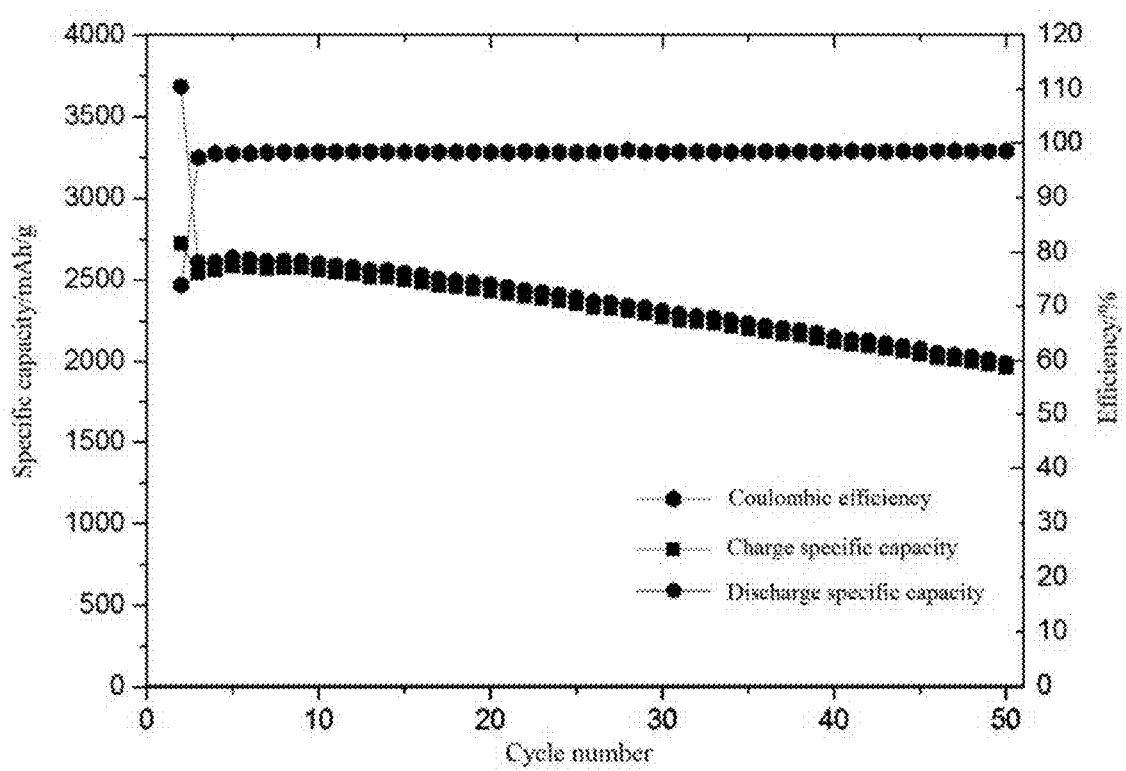
FIG. 15 is a graph showing charge-discharge cycling discharge capacity and charge-discharge efficiency of a lithium-ion battery comprising only nano-copper coated nano-silicon negative electrode material prepared in Comparative Example 2 of the present invention.

It can be observed from the charge-discharge cycle curves of the samples of Examples 1 and 2 and Comparative Examples 1 and 2 in FIGS. 12, 13, 14 and that the electrochemical cycling performance of nano-copper-coated nano-silicon negative electrode is far superior to that of uncoated nano-silicon negative electrode, and the electrochemical cycling performance of the carbon-copper double layer composite-coated nano-silicon negative electrode is significantly superior to that of the only nano-copper-coated nano-silicon negative electrode.

Table 1 lists the electrochemical performance comparisons of the negative electrode materials prepared in the respective examples and comparative examples of the present invention. Table 2 lists the comparison of electrochemical performance of nano-silicon negative electrode materials under different coating conditions.

TABLE 1

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Second cycle reversible capacity (mAh/g) | 2542 | 2381 | 2430 | 2455 | 1295 | 2223 | 2974 | 2540 | 1384 | 1305 |
| Reversible capacity after 50 cycles (mAh/g) | 2312 | 2214 | 2193 | 2213 | 1221 | 2027 | 1012 | 1961 | 1201 | 1 |
| Average Coulomb efficiency from the second cycle to the 50th cycle | 98.43% | 98.64% | 98.40% | 98.35% | 99.6% | 99.3% | 97.96% | 98.38% | 98.93% | 98.83% |
| Capacity retention rate after the second cycle to 50 cycles | 90.95% | 92.99% | 90.25% | 90.14% | 94.3% | 91.2% | 34.03% | 77.20% | 86.78% | 57.91% |

It can be observed from the data in Table 1 that, the electrochemical cycling performance of nano-copper-coated nano-silicon negative electrode is far superior to that of uncoated nano-silicon negative electrode, and the electrochemical cycling performance of the conductive protective layer and copper double layer composite-coated nano-silicon negative electrode is significantly superior to that of the only nano-copper-coated nano-silicon negative electrode.

particle size of 0.5~100 nm; and the copper coating layer has a thickness of 0.5~100 nm.

5. The nanoparticle-silicon negative electrode material according to claim 1, wherein the mass of the copper film accounts for 0.5~60 wt % of the nanoparticle-silicon negative electrode material; and the mass of the conductive protective layer accounts for 0.1~20 wt % of the nanoparticle-silicon negative electrode material.

TABLE 2

| Battery number | Silicon particle size (nm) | Silicon content (g/L) | CuSO$_4$ content (g/L) | C$_2$H$_2$ flow rate (sccm) | C$_2$H$_2$ introducing time (min) | Second cycle reversible capacity (mAh/g) | Reversible capacity after 50 cycles (mAh/g) | Average Coulomb efficiency from the second cycle to the 50th cycle (%) | Capacity retention rate after the second cycle to 50 cycles (%) |
|---|---|---|---|---|---|---|---|---|---|
| 1 | 100 | 0.5 | 1 | 100 | 90 | 2381 | 2214 | 98.64 | 92.99 |
| 2 | 100 | 0.5 | 0 | 0 | 0 | 2974 | 1012 | 97.96 | 34.03 |
| 3 | 100 | 0.5 | 1 | 0 | 0 | 2540 | 1961 | 98.38 | 77.20 |
| 4 | 100 | 0.5 | 1 | 100 | 30 | 2350 | 2012 | 98.40 | 85.62 |
| 5 | 100 | 0.5 | 1 | 100 | 300 | 2210 | 1754 | 97.30 | 79.37 |
| 6 | 100 | 0.5 | 1 | 50 | 90 | 2360 | 2015 | 98.15 | 85.38 |
| 7 | 100 | 0.5 | 0.5 | 0 | 0 | 2710 | 1765 | 98.03 | 65.13 |
| 8 | 100 | 0.5 | 0.5 | 100 | 90 | 2251 | 1987 | 98.41 | 88.31 |
| 9 | 100 | 0.5 | 2 | 100 | 90 | 2403 | 2093 | 98.01 | 87.10 |
| 10 | 100 | 0.5 | 4 | 100 | 90 | 932 | 231 | 65.30 | 24.79 |
| 11 | 100 | 0.3 | 1 | 100 | 90 | 2238 | 1787 | 98.20 | 79.58 |
| 12 | 100 | 1 | 1 | 100 | 90 | 2453 | 1887 | 98.06 | 74.20 |
| 13 | 100 | 6 | 1 | 100 | 90 | 2550 | 1832 | 98.12 | 71.84 |
| 14 | 500 | 0.5 | 1 | 100 | 90 | 2321 | 1951 | 98.20 | 84.02 |
| 15 | 200 | 0.5 | 1 | 100 | 90 | 2441 | 2135 | 98.36 | 87.46 |
| 16 | 50 | 0.5 | 1 | 100 | 90 | 2452 | 2265 | 98.55 | 92.38 |
| 17 | 30 | 0.5 | 1 | 100 | 90 | 2461 | 2269 | 98.49 | 92.21 |

It can be observed from the data in Table 2 that it is most suitable that the concentration of silicon is at about 0.5 g/L and the particle size is from 50 to 100 nm, both too little copper coating and too more copper coating have an adverse effect on battery performance, and the silicon-copper mass ratio is preferably controlled at 3:1. The electrochemical performance of a battery is also significantly improved after a carbon layer is coated outside the copper layer, but the proportion of the carbon layer is preferably controlled at 5% to 10%.

The invention claimed is:

1. A double layer-coated nanoparticle-silicon negative electrode material, comprising: a silicon-based nanoparticle, a copper film formed by melting copper particles coated on the surface of the silicon-based nanoparticle, and a conductive protective layer coated on the surface of the copper film wherein the conductive protective layer is carbon.

2. The nanoparticle-silicon negative electrode material according to claim 1, wherein the silicon-based nanoparticle has a particle size of 5~500 nm; the copper film has a thickness of 0.5~100 nm; and the conductive protective layer has a thickness of 1~200 nm.

3. The nanoparticle-silicon negative electrode material according to claim 1, wherein the silicon-based nanoparticle is silicon nanoparticle, silicon carbon nanoparticle, or silicon alloy nanoparticle; wherein the weight percentage of silicon in the silicon carbon nanoparticle and the silicon alloy nanoparticle can be 2% to 70%; wherein the silicon alloy is selected from one or more of silicon aluminum alloy, silicon tin alloy, silicon silver alloy and silicon magnesium alloy; and wherein the copper film is nanoparticle-copper or a copper coating layer with a nanometer thickness.

4. The nanoparticle-silicon negative electrode material according to claim 3, wherein the nanoparticle-copper has a 6. A method for preparing a nanoparticle-silicon negative electrode material according to claim 1, comprising the steps of:
  (1) adding a silicon-based nanoparticle to a solvent, then adding a dispersing agent to obtain a suspension, and then ultrasonically dispersing the suspension;
  (2) adding a copper plating agent to the ultrasonically dispersed suspension, then adding dropwise a reducing agent to perform chemical copper plating, and finally filtrating, washing and drying the same in vacuum oven to obtain a nanoparticle-copper-coated silicon-based nanoparticle composite material;
  (3) coating a conductive protective layer on the surface of the nano-copper-coated silicon-based nanocomposite material; and
  (4) heat treating the composite material obtained in step (3) to cure it, such that the nanoparticle copper melts to form a copper film.

7. The method according to claim 6, wherein the solvent in step (1) is one or more of water, methanol, ethanol, propanol, isopropanol, butanol and ethylene glycol; and the dispersing agent is one or more of methanol, ethanol, ethylene glycol, propanol and isopropanol.

8. The method according to claim 6, wherein the composition of the copper plating agent in step (2) is as follows: a soluble copper salt: 1~20 g·L$^{-1}$; potassium sodium tartrate: 5~100 g·L$^{-1}$; ethylenediaminetetraacetic acid or ammonia water: 5~100 g·L$^{-1}$; 2,2-bipyridine: 1~50 mg·L$^{-1}$; wherein the soluble copper salt comprises one or more of tetrakis (acetonitrile)copper(I) hexafluorophosphate (C8H12CuF6N4P), CuCl$_2$, CuCl, CuC$_2$O$_4$, Cu(CH$_3$COO)$_2$, CuSO$_4$ and Cu(NO$_3$)$_2$, and wherein the reducing agent is sodium borohydride, sodium hypophosphite, borane or formaldehyde, and the concentration of the reducing agent is 1~20 g·L$^{-1}$.

9. The method according to claim 6, wherein coating the conductive protective layer in step (3) is carried out by a method including hydrothermal coating, organic coating, and CVD coating, preferably CVD coating.

10. The method according to claim 6, wherein the heat treating in step (4) comprises: heat radiation and/or microwave heating.

11. A negative electrode, comprising a current collector and a negative electrode material, a conductive additive, and a binder loaded on the current collector, wherein the negative electrode material is the double layer-coated nanoparticle-silicon negative electrode material of claim 1.

12. A lithium-ion battery, comprising a battery shell, an electrode assembly, and an electrolyte, the electrode assembly and electrolyte being sealed in the battery shell, and the electrode assembly comprising a positive electrode, a separator, and a negative electrode, wherein the negative electrode is the negative electrode of claim 11.

13. A negative electrode, comprising a current collector and a negative electrode material, a conductive additive, and a binder loaded on the current collector, wherein the negative electrode material is the double layer-coated nanoparticle-silicon negative electrode material of claim 6.

14. The nanoparticle-silicon negative electrode material according to claim 1, wherein the silicon-based nanoparticle has a particle size of 20~200 nm; the copper film has a thickness of 1~50 nm, and the conductive protective layer has a thickness of 5~50 nm.

15. The nanoparticle-silicon negative electrode material according to claim 3, wherein the nanoparticle-copper has a particle size of 1~50 nm; and the copper coating layer has a thickness of 1~50 nm.

16. The nanoparticle-silicon negative electrode material according to claim 1, wherein the mass of the copper film accounts for 10~40 wt % of the nanoparticle-silicon negative electrode material; and the mass of the conductive protective layer accounts for 1~10 wt % of the nanoparticle-silicon negative electrode material.

17. The method according to claim 6, wherein the concentration of the nanoparticle-silicon in the nanoparticle-silicon suspension is $0.1~10$ g·L$^{-1}$.

18. The method according to claim 6, wherein coating the conductive protective layer in step (3) is carried out by CVD coating, wherein the CVD coating is to coat with carbon by $C_2H_2$ gas, and the conditions of coating comprise: $C_2H_2$: 1~300 sccm; temperature:
300~450° C.; and time: 5 min~10 h.

* * * * *